J. WALKER.
Ventilator and Chimney-Cap.

No. 199,599. Patented Jan. 22, 1878.

Witnesses.
Geo. W. Pierce
A. E. Denison

Inventor
John Walker
by Knight & Brown
Attys

UNITED STATES PATENT OFFICE.

JOHN WALKER, OF BOSTON, MASSACHUSETTS, ASSIGNOR TO CHARLES M. DRENNAN, OF SAME PLACE.

IMPROVEMENT IN VENTILATOR AND CHIMNEY-CAP.

Specification forming part of Letters Patent No. 199,599, dated January 22, 1878; application filed December 18, 1877.

*To all whom it may concern:*

Be it known that I, JOHN WALKER, of Boston, in the county of Suffolk and State of Massachusetts, have invented certain Improvements in Ventilator and Chimney-Cap, of which the following is a specification:

This invention has for its object to provide an improved top for ventilators and chimneys, which shall insure an upward and outward draft at all times, and prevent air from passing down the tube or chimney.

To this end the invention consists, first, in a tube or conduit covered at its top, and provided with any desired number of lateral discharge-openings near the top, and with a series of shields located outside of and opposite to the openings in such manner as to form substantially vertical passages opposite each opening, said passages being open at their upper and lower ends, and preferably wider at their lower than at their upper ends.

The invention consists, secondly, in a peculiarly-shaped cap or cover for a vertical tube or conduit, said cover being composed of a series of radiating horizontal gables joined together at their inner ends, their outer ends constituting the lateral openings above mentioned, when the cap is applied to the tube or conduit, the cap being of greater size in plan than the diameter of the tube, all of which I will now proceed to describe.

Figure 1:
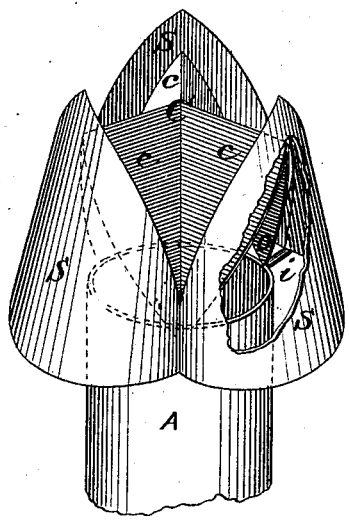
Figure 2:
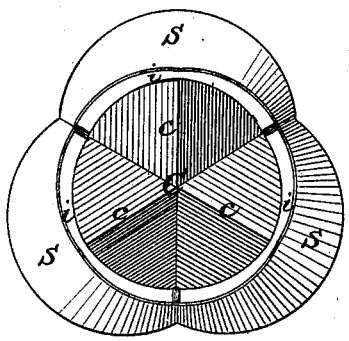
Figure 3:
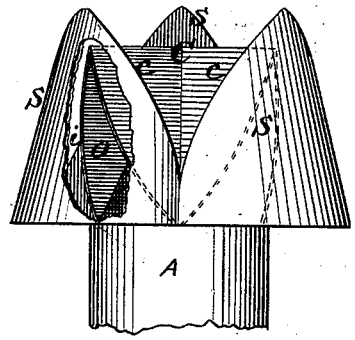
Figure 5:
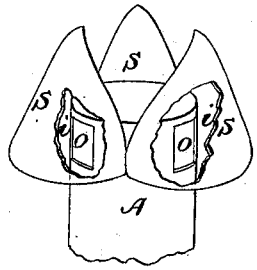
Figure 4:
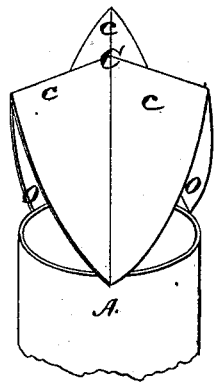
Figure 6:
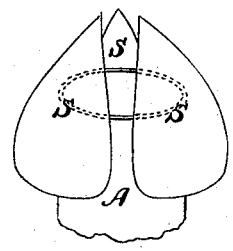

Of the accompanying drawings, forming a part of this specification, Figure 1 represents a perspective view of a ventilator and chimney-cap embodying my invention. Fig. 2 represents a top view of the same. Fig. 3 represents a side view. Fig. 4 represents a perspective view of the tube and cap without the shields. Figs. 5 and 6 represent perspective views of modifications.

Similar letters of reference refer to like parts in all the figures.

In the drawings, A represents the vertical tube or conduit of a ventilator or chimney-cap, which tube is covered at its upper end, and provided under the cover with any desired number of lateral openings O. The tube may be made with its upper end closed, and with orifices cut in its periphery for the lateral openings, as shown in Fig. 5; or its upper end may be open and covered by a peculiarly-shaped cap, C, as shown in Figs. 1, 2, 3, and 4, said cap being composed of a series of radiating horizontal gables, c, joined together at their inner ends, their outer ends constituting the openings O. This cap is preferably larger in plan than the diameter of the tube A, and is secured thereto in any suitable manner in the position shown in the drawings.

S S S represent the shields, which are composed, preferably, of triangular-shaped sheets of metal bent laterally into a concavo-convex form. Each of these shields is located outside of and opposite to one of the openings O, as shown, in such position as to form a barrier to the entrance of rain, &c., into said openings, the shields being of greater area than the openings. The shields are separated from the openings at all points by spaces $i$, and these spaces are preferably wider at their lower than at their upper ends, the shields being inclined inwardly from their lower to their upper ends, as shown.

It will be seen that the shields S, in connection with the lateral openings in the tube A, facilitate an upward current in said tube, the shields preventing the direct entrance of air into the lateral openings, and creating the spaces $i$ opposite each opening, and these spaces, being widest at their lower ends, cause the air that is directed against the side of the tube A to pass upwardly past the openings O, thereby drawing air outwardly through said openings, and facilitating the upward draft. The cap C or the closed end of the tube A prevents a direct downward passage of air into the tube. The inclined sides of the gables $c$, composing the cap C, deflect upwardly any horizontal currents of air that are directed against them, and thus produce an effect like that produced by the spaces $i$.

The shields may be employed in connection with a pipe open at its upper end, as shown in Fig. 6, in which case the shields would be inclined inwardly more than when the pipe is capped or covered, to prevent the entrance of rain into the pipe to a greater extent. In this form the spaces between the shields will allow the free upward and lateral passage of air from the pipe, while the inclination of the shields and the spaces between their inner sides and the sides of the pipe will prevent air from passing down the pipe, a current of air passing laterally into the space between the shields over the end of the pipe impinging against the inner surfaces of the shields, and being conducted out thereby.

I claim as my invention—

1. A ventilator and chimney-cap composed of a tube or conduit, closed or capped at its top, and provided with lateral discharge-openings, and a series of shields located on the outside of the tube or conduit opposite the lateral openings, and entirely separated from said openings by spaces $i$, whereby air is permitted to pass vertically between the shields and openings, as set forth.

2. The cap C, composed of the radiating horizontal gables $c$, joined together at their inner ends, and having openings O at their outer ends, in combination with a tube or conduit, A, said cap constituting a covering, and a series of lateral discharge-openings for the tube or conduit, as set forth.

3. The combination of the cap C, constructed as described, with the tube or conduit A and the shields S, located outside of and opposite to the openings of said cap, and separated entirely from said openings by spaces $i$, substantially as and for the purpose specified.

4. The combination of the shields S with a tube or conduit, A, said shields being separated from the tube or conduit by spaces, which are unobstructed from top to bottom of the shields, as set forth.

In testimony whereof I have signed my name to this specification in the presence of two subscribing witnesses this 12th day of December, 1877.

JOHN WALKER.

Witnesses:
 CHAS. M. DRENNAN,
 C. F. BROWN.